United States Patent
Peng et al.

(10) Patent No.: US 8,193,794 B2
(45) Date of Patent: Jun. 5, 2012

(54) VOLTAGE REGULATOR HAVING AN OUTPUT VOLTAGE AUTOMATICALLY ADJUSTED ACCORDING TO A LOAD CURRENT

(75) Inventors: Hung-Chun Peng, Dali (TW); Kuo-Lung Tseng, Lungtan Township, Taoyuan County (TW); Jian-Rong Huang, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 116 days.

(21) Appl. No.: 12/857,800

(22) Filed: Aug. 17, 2010

(65) Prior Publication Data

US 2012/0038334 A1   Feb. 16, 2012

(30) Foreign Application Priority Data

Aug. 20, 2009   (TW) .............................. 98128089 A

(51) Int. Cl.
*G05F 1/44* (2006.01)

(52) U.S. Cl. ....................................... 323/282

(58) Field of Classification Search .................. 323/273, 323/280, 282–285, 351
See application file for complete search history.

(56) References Cited

U.S. PATENT DOCUMENTS

| 4,823,070 | A  | * | 4/1989  | Nelson ......................... 323/285 |
|-----------|----|---|---------|----------------------------------------|
| 7,145,317 | B1 | * | 12/2006 | Shah ............................ 323/288 |
| 7,265,523 | B2 | * | 9/2007  | Dowlatabadi ................. 323/222 |
| 7,940,033 | B2 | * | 5/2011  | Dowlatabadi ................. 323/284 |
| 8,018,210 | B2 | * | 9/2011  | Chen et al. .................... 323/224 |
| 2010/0066328 | A1 | * | 3/2010 | Shimizu et al. ............... 323/282 |
| 2011/0031948 | A1 | * | 2/2011 | Chien et al. ................... 323/282 |
| 2011/0260703 | A1 | * | 10/2011 | Laur et al. .................... 323/271 |

* cited by examiner

*Primary Examiner* — Adolf Berhane
(74) *Attorney, Agent, or Firm* — Rosenberg, Klein & Lee

(57) ABSTRACT

A voltage regulator includes an adjuster to provide an adjust signal according to its load current to adjust at least one of the feedback signal, the reference signal, the error signal, and the ripple signal of the voltage regulator, to automatically adjust the output voltage. The output voltage increases when the load current increases, and decreases when the load current decreases. Preferably, a CCR voltage regulator according to the present invention will have its PWM frequency varying with its output voltage and thus have better transient performance.

6 Claims, 9 Drawing Sheets

VOLTAGE REGULATOR HAVING AN OUTPUT VOLTAGE AUTOMATICALLY ADJUSTED ACCORDING TO A LOAD CURRENT

FIELD OF THE INVENTION

The present invention is related generally to a voltage regulator and, more particularly, to a circuit and method for a voltage regulator to automatically adjust an output voltage according to a load current.

BACKGROUND OF THE INVENTION

Overclocking is a method for improving the performance of electronic components such as CPUs, RAMs and display cards by increasing the clocking frequency of the electronic components to be higher than that pre-set by the manufacturers thereof. After being overclocked, an electronic component can deliver efficiency comparable to that of higher-level products. However, overclocking may also cause increased temperature, degraded stability, and even shortened service life or burning-out of the electronic components, so it usually needs to be used in combination with suitable heat dissipation devices. As users are becoming increasingly familiar with computers, more and more users now prefer to try overclocking. Thus, whether an electronic component is suitable and easy to be overclocked becomes a concern for consumers when purchasing the electronic components.

For common overclocking, e.g. overclocking a CPU, a simple practice is to modify the doubling frequency and an external frequency of the CPU in the BIOS of the motherboard according to demands and computation formulas by users themselves. However, apart from adjusting the frequencies, it is sometimes also necessary to increase the working voltage supplied to the electronic component to accomplish the overclocking successfully. The voltage may likewise be manually adjusted to the BIOS, but the adjustment extent needs to be tried by users themselves.

SUMMARY OF THE INVENTION

For overclocking demands, the present invention provides a voltage regulator and a method therefor to automatically adjust an output voltage according to a load current.

According to the present invention, a voltage regulator includes an output stage to receive an input voltage from a power input terminal and supply an output voltage and a load current at a power output terminal, an error amplifier to generate an error signal according to the difference between an output-dependent feedback signal and a reference signal, a comparator to compare the error signal with a ripple signal to generate a comparison signal used for operating the output stage to convert the input voltage to the output voltage, and an adjuster to generate an adjust signal according to the load current to adjust at least one of the feedback signal, the reference signal, the error signal and the ripple signal to thereby adjust the output voltage. When the load current increases, the adjust signal will increase the output voltage; and when the load current decreases, the adjust signal will decrease the output voltage.

According to the present invention, a method for a voltage regulator to automatically adjust an output voltage according to a load current includes generating a feedback signal according to the output voltage, amplifying the difference between the feedback signal and a reference signal to generate an error signal, comparing the error signal with a ripple signal to generate a comparison signal used for operating an output stage of the voltage regulator to convert an input voltage to the output voltage, and generating an adjust signal according to the load current for adjusting at least one of the feedback signal, the reference signal, the error signal and the ripple signal to thereby adjust the output voltage. When the load current increases, the adjust signal will increase the output voltage; and when the load current decreases, the adjust signal will decrease the output voltage.

Preferably, the voltage regulator according to the present invention is implemented with constant current ripple (CCR) topology. Increase in an output voltage of a voltage regulator with CCR topology can also make the switching frequency of the voltage regulator become higher naturally, comparing with constant frequency topology, and higher frequency can decrease response time and has better transient performance.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
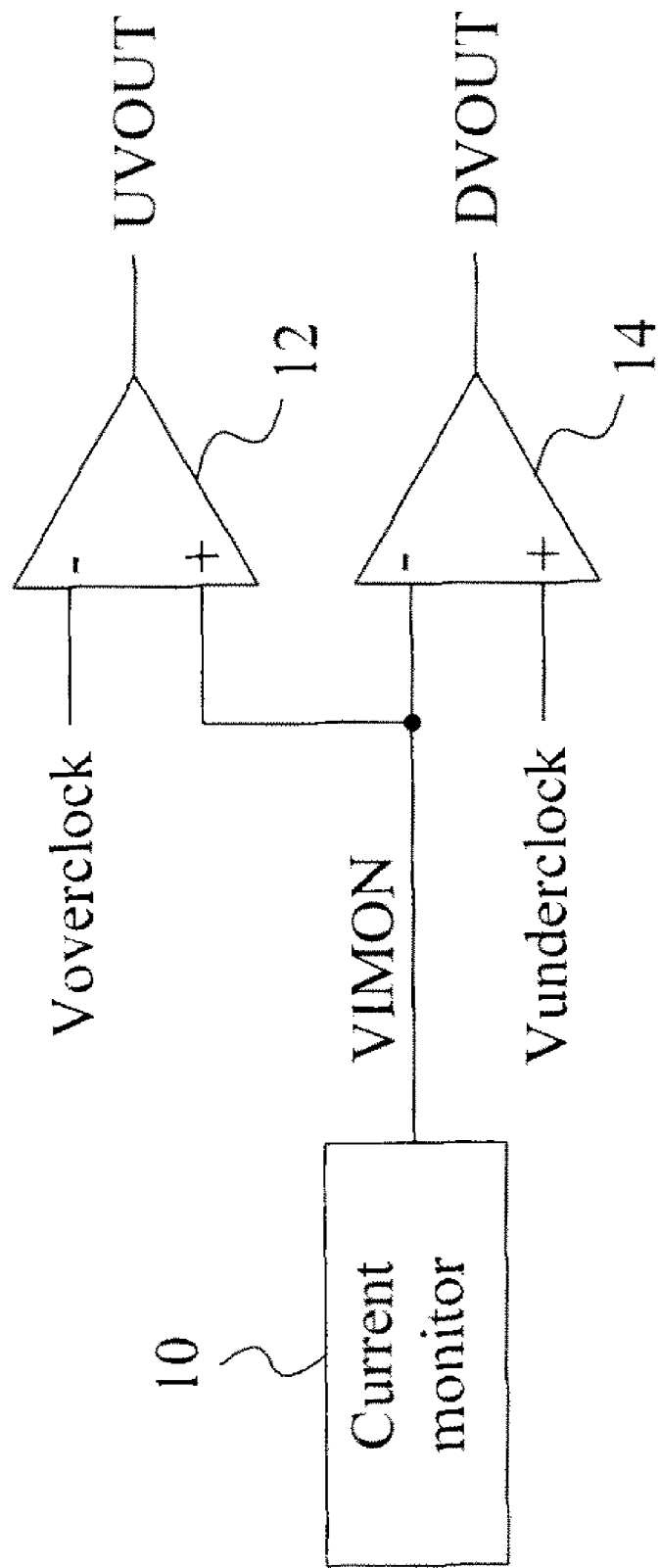
FIG. 1 is a schematic view of an embodiment for an adjuster according to the present invention.
Figure 2:
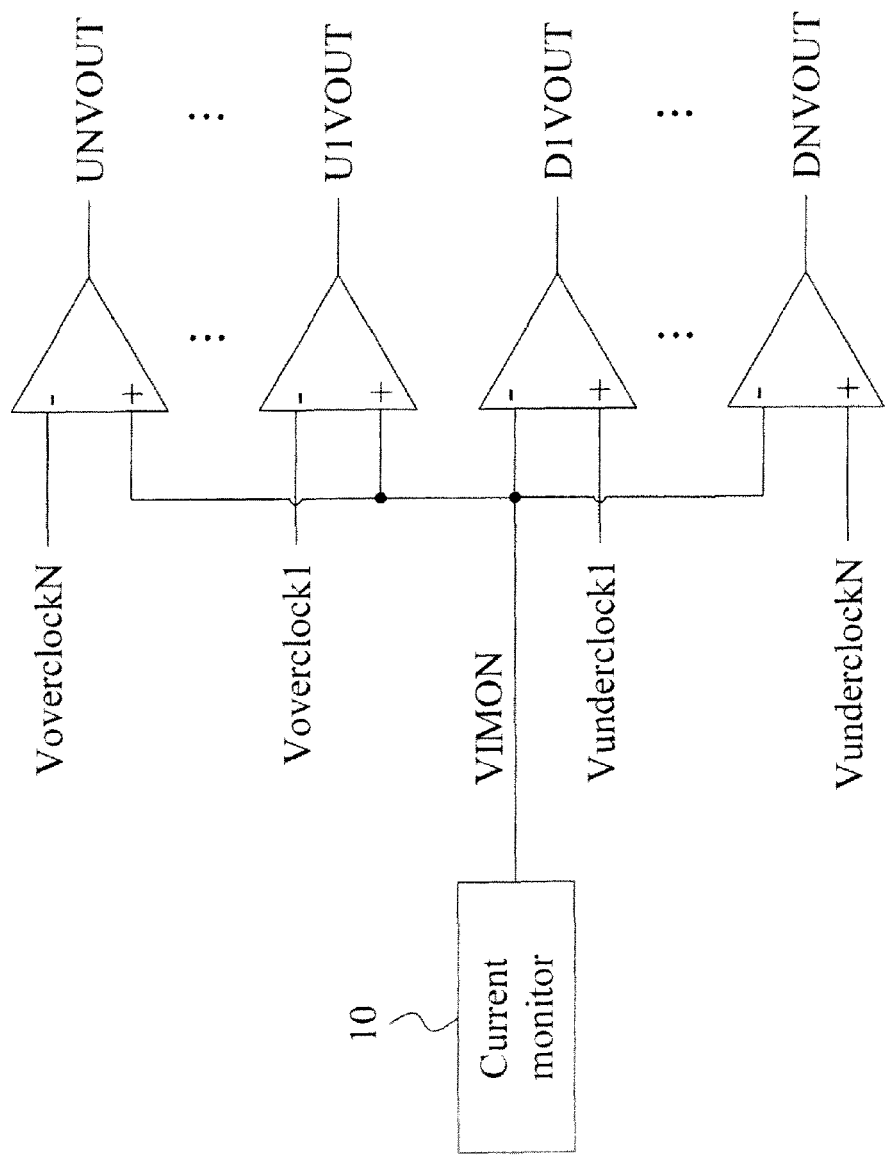
FIG. 2 is a schematic view of another embodiment for an adjuster according to the present invention.

According to the present invention, as shown in FIG. 1, a current monitor 10 is connected to an output stage (not shown in FIG. 1) of a voltage regulator to monitor the variation of the load current of the voltage regulator to generate a monitoring voltage VIMON applied to a positive input terminal of a comparator 12 and a negative input terminal of a comparator 14, to be compared with an overclocking voltage Voverclock and an underclocking voltage Vunderclock to determine an overclocking signal UVOUT and an underclocking signal DVOUT, respectively. When the monitoring voltage VIMON rises to be higher than the overclocking voltage Voverclock, the comparator 12 asserts the overclocking signal UVOUT; and when the monitoring voltage VIMON falls to be lower than the underclocking voltage Vunderclock, the comparator 14 asserts the underclocking signal DVOUT. The overclocking signal UVOUT and the underclocking signal DVOUT are used to generate an adjust signal for the voltage regulator to increase or decrease its output voltage. In some embodiments, as shown in FIG. 2, a designer may set up multiple overclocking voltages Voverclock1-VoverclockN and underclocking voltages Vunderclock1-VunderclockN depending on actual demands, and according to the extent to which the load current of the voltage regulator increases or decreases, either the overclocking signals U1VOUT-UNVOUT or the underclocking signals D1VOUT-DNVOUT may be used to adjust the adjust signal for the voltage regulator correspondingly so as to adjust the output voltage of the voltage regulator.

Figure 3:
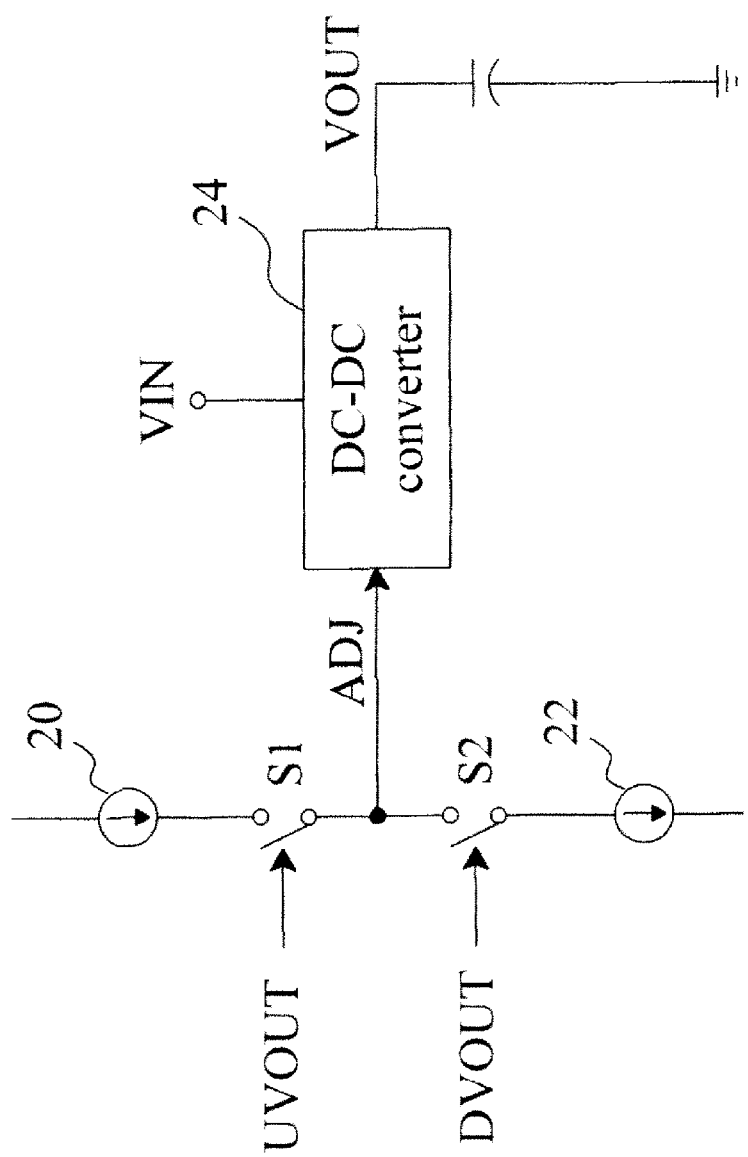
FIG. 3 is a schematic view of an embodiment using an adjuster according to the present invention to adjust an output voltage of a voltage regulator.

FIG. 3 shows an embodiment according to the present invention, in which switches S1 and S2 are connected between a DC-DC converter 24 and current sources 20 and 22 respectively, and the overclocking signal UVOUT and the underclocking signal DVOUT described above are used to control the switches S1 and S2 respectively, to determine an adjust signal ADJ. When the overclocking signal UVOUT is high, the switch S1 is closed, the underclocking signal DVOUT is low, and the switch S2 is opened, so the current source 20 injects an adjust current ADJ to charge a certain node in the DC-DC converter 24 to increase the output voltage VOUT. On the other hand, when the underclocking signal DVOUT is high, the switch S2 is closed, the overclocking signal UVOUT is low, and the switch S1 is opened, so the current source 22 drains an adjust current ADJ from a certain node in the DC-DC converter 24 to decrease the output voltage VOUT.

Figure 4:
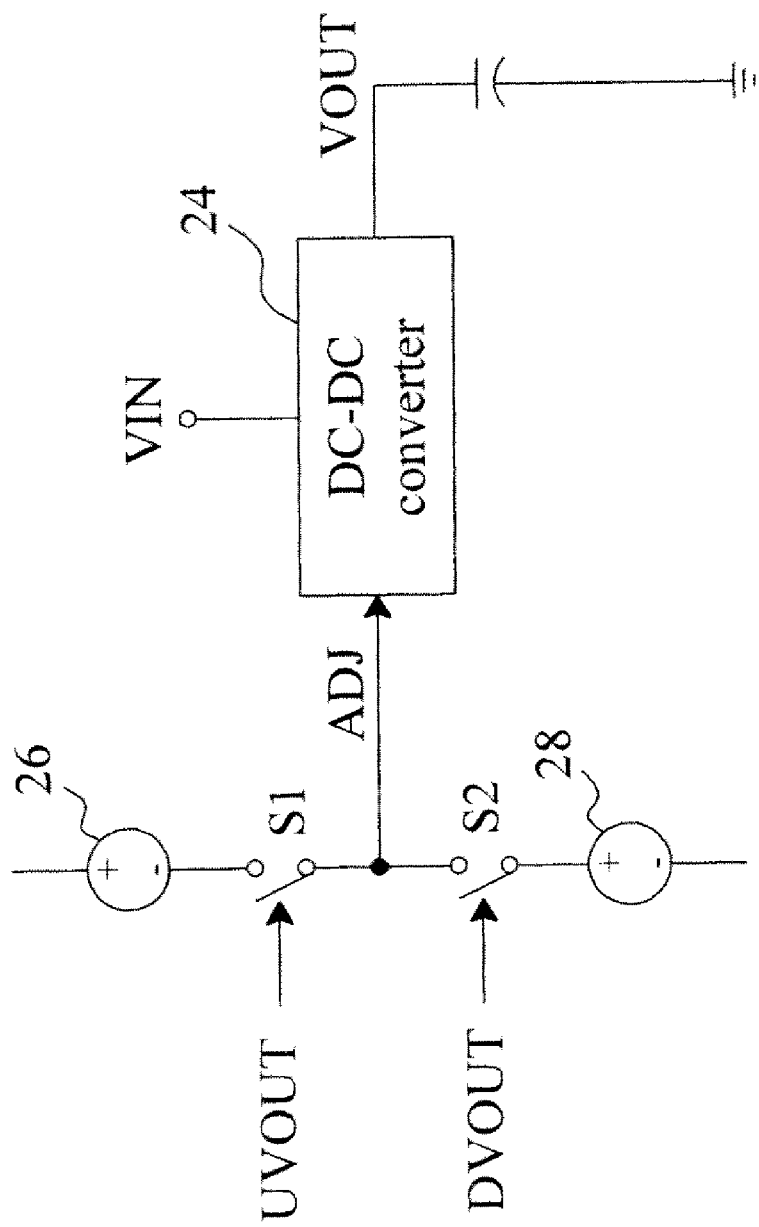
FIG. 4 is a schematic view of another embodiment using an adjuster according to the present invention to adjust an output voltage of a voltage regulator.

Alternatively, as shown in FIG. 4, the current sources 20 and 22 shown in FIG. 3 are replaced with voltage sources 26 and 28 respectively. When the overclocking signal UVOUT closes the switch S1, the voltage at a certain node in the DC-DC converter 24 will increase by a value due to the voltage source 26 and thus increase the output voltage VOUT; and when the underclocking signal DVOUT closes the switch S2, the voltage at a certain node in the DC-DC converter 24 will decrease by a value due to the voltage source 28 and thus decrease the output voltage VOUT.

Figure 5:
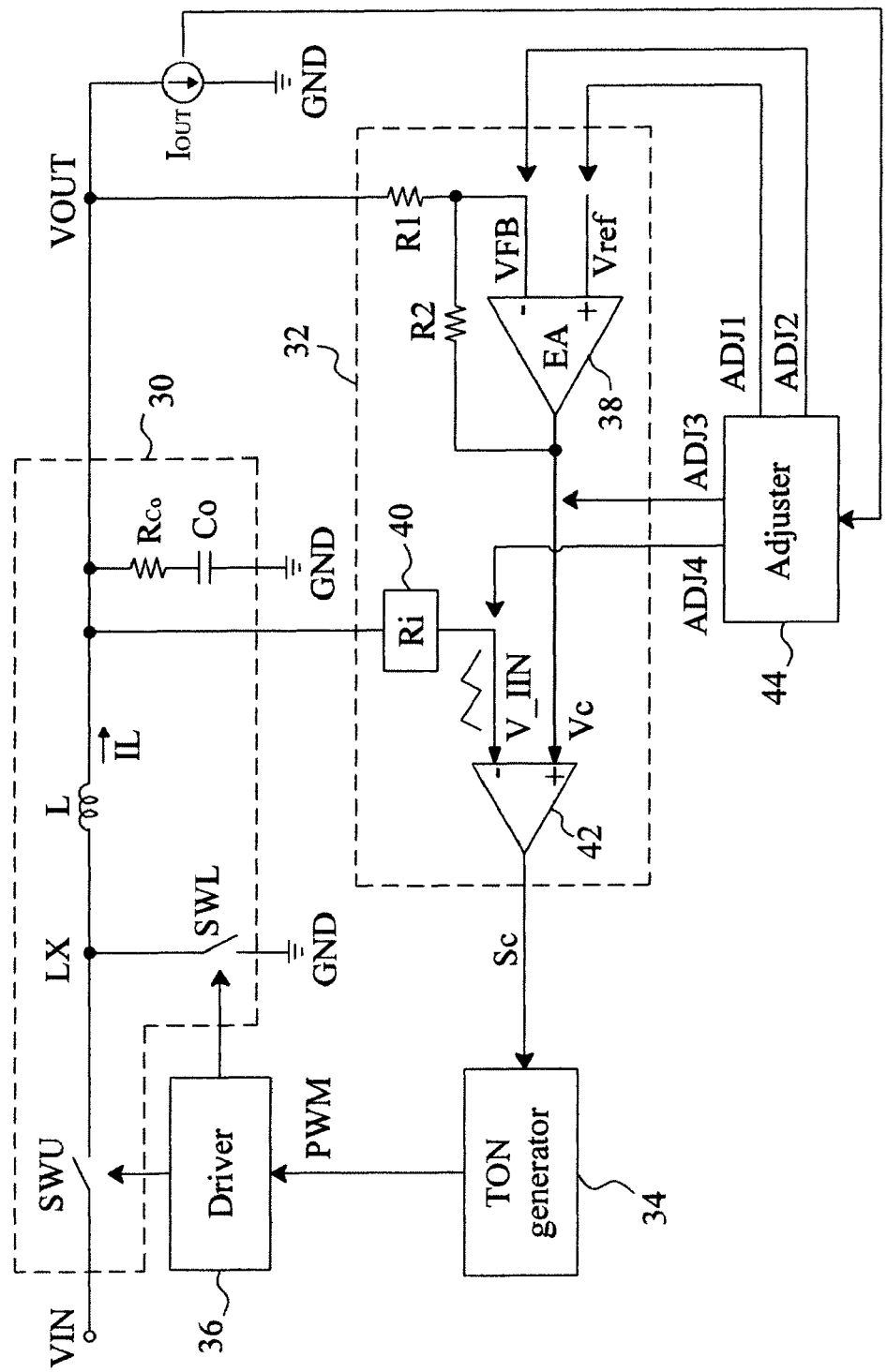
FIG. 5 is a circuit diagram of a CCR voltage regulator using an adjuster according to the present invention.
Figure 6:
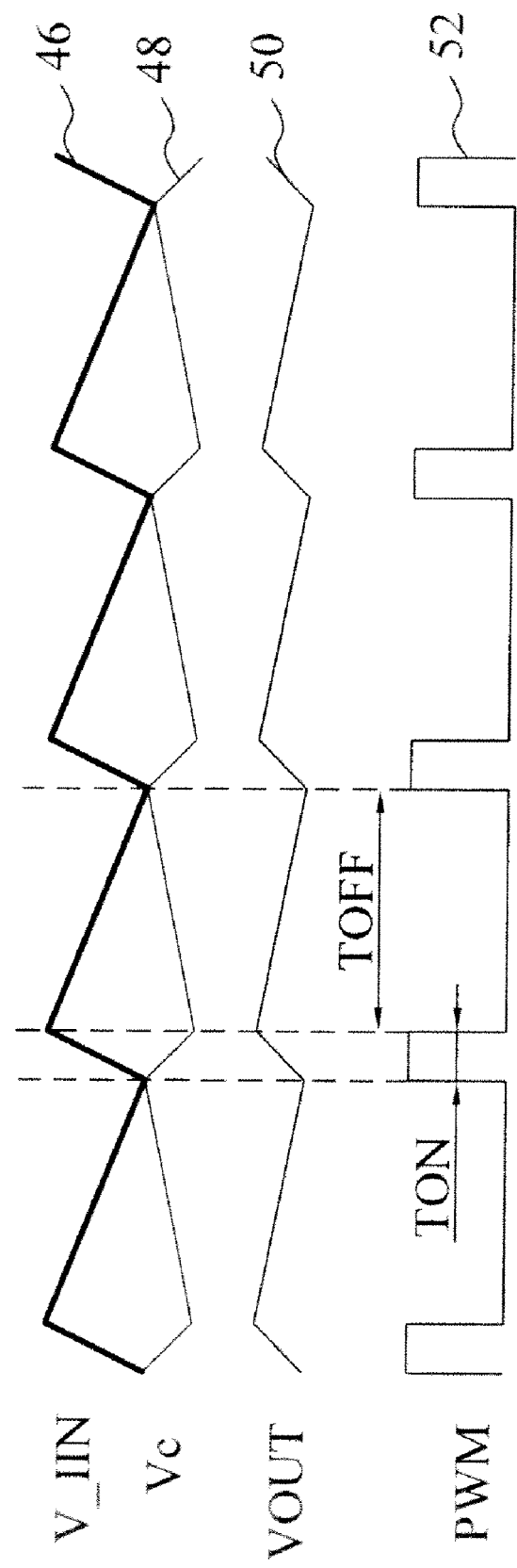
FIG. 6 is a waveform diagram of the circuit shown in FIG. 5.

FIG. 5 shows an embodiment of a CCR voltage regulator according to the present invention, and FIG. 6 is a waveform diagram of the CCR voltage regulator shown in FIG. 5. In this CCR voltage regulator, an output stage 30 is connected between a power input terminal receiving an input voltage VIN and a power output terminal supplying an output voltage VOUT and a load current $I_{OUT}$, and a feedback circuit 32 is connected to the power output terminal VOUT to generate a comparison signal Sc for an On time generator 34 to generate a pulse width modulation signal PWM to operate the output stage 30 by a driver 36 to convert the input voltage VIN to the output voltage VOUT. In the output stage 30, an upper-bridge switch SWU and a lower-bridge switch SWL are connected in series between the power input terminal VIN and ground GND to be switched by the driver 36, an inductor L is connected between a phase node LX and the power output terminal VOUT to establish an inductor current IL to charge an output capacitor Co to supply the output voltage VOUT and the load current $I_{OUT}$. The output voltage VOUT has a waveform 50 as shown in FIG. 6. In the feedback circuit 32, a ripple monitor 40 monitors the inductor current IL to generate a ripple signal V_IIN, as shown by a waveform 46 in FIG. 6, resistors R1 and R2 divide the output voltage VOUT to generate a feedback signal VFB, an error amplifier 38 generates an error signal Vc according to the difference between the feedback signal VFB and a reference signal Vref, as shown by a waveform 48 in FIG. 6, and a comparator 42 compares the error signal Vc with the ripple signal V_IIN to generate the comparison signal Sc. When the ripple signal V_IIN falls to be lower than the error signal Vc, the comparator 46 asserts the comparison signal Sc so that the on time generator 34 triggers an on time pulse TON, as shown by a waveform 52 in FIG. 6. During the on time TON, the driver 36 closes the upper-bridge switch SWU and opens the lower-bridge switch SWL and thus causes the output voltage VOUT increasing. After the on time TON elapses, the upper-bridge switch SWU is opened and the lower-bridge switch SWL is closed, causing the output voltage VOUT decreasing. This is the procedure for a common CCR voltage regulator to regulate its output voltage VOUT at a setting value. However, an adjuster 44 according to the present invention generates an adjust signal ADJ to adjust at least one of the feedback signal VFB, the reference signal Vref, the error signal Vc, and the ripple signal V_IIN to thereby adjust the DC level of the output voltage VOUT. Taking a case in which the adjuster 44 uses an adjust signal ADJ1 to adjust the reference signal Vref as an example, when the load current $I_{OUT}$ rises to be greater than a certain preset value, the adjuster 44 asserts the adjust signal ADJ1 to charge the positive input terminal of the error amplifier 38, resulting in an increase of the reference signal Vref, and thus the difference between the reference signal Vref and the feedback signal VFB is enlarged, so triggering of the comparison signal Sc is accelerated to cause the frequency of the pulse width modulation signal PWM to increase, giving rise to an increase of the output voltage VOUT. On the other hand, if the adjuster 44 uses an adjust signal ADJ2 to adjust the feedback signal VFB, then when the load current $I_{OUT}$ rises to be greater than a certain preset value, the adjuster 44 asserts the adjust signal ADJ2 to discharge the negative input terminal of the error amplifier 38, and as a result the feedback signal VFB is pulled low, which will increase the frequency of the pulse width modulation signal PWM and thereby the output voltage VOUT. From a simple viewpoint, the adjust signal ADJ is regarded as an offset to be added to the original feedback signal VFB, the reference signal Vref, the error signal Vc, or the ripple signal V_IIN, causing the DC level of the output voltage VOUT to increase or decrease. Because the adjust signal ADJ is determined according to the magnitude of the load current $I_{OUT}$, the CCR voltage regulator can automatically adjust its output voltage VOUT according to its load current $I_{OUT}$.

There are various approaches that can be used to detect the load current $I_{OUT}$ of a voltage regulator to provide a signal representative of the load current $I_{OUT}$ for the adjuster 44. Apart from directly detecting the current $I_{OUT}$ at the power output terminal VOUT, the current of the upper-bridge switch SWU, the current of the lower-bridge switch SWL, or the inductor current IL may also be detected, and all of these detecting devices and methods are prior arts.

Figure 7:
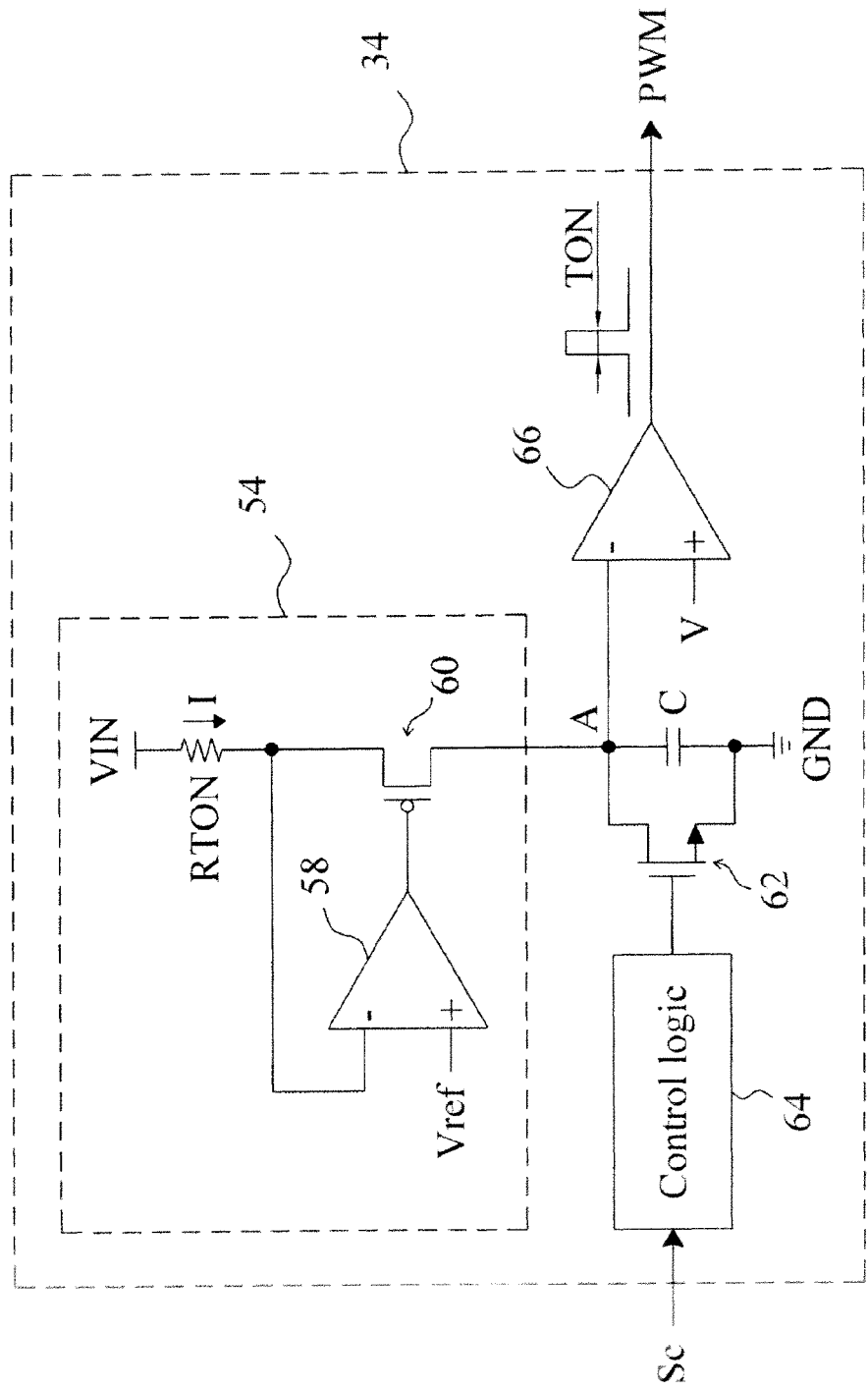
FIG. 7 is a circuit diagram of an embodiment for the on time generator shown in FIG. 5.

FIG. 7 provides an embodiment for the on time generator 34 shown in FIG. 5. In a current source 54, an operational amplifier 58 and a transistor 60 constitute a unit gain amplifier, and the input voltage VIN, the reference voltage Vref, and a resistor RTON determine the current $$I=(VIN-Vref)/RTON, \qquad [\text{Eq-1}]$$

which is used to charge a capacitor C. A MOS 62 is connected in parallel with the capacitor C, and the comparison signal Sc triggers a control logic 64 to turn on the MOS 62 to reset the capacitor voltage to zero. A comparator 66 compares the voltage at the node A with a voltage V, so the pulse width modulation signal PWM has the on time $$TON=C\times V/I. \qquad [\text{Eq-2}]$$

From the equations Eq-1 and Eq-2, it is derived the on time $$TON=(C\times V\times RTON)/(VIN-Vref). \qquad [\text{Eq-3}]$$

Derived from FIG. 5 and the equation Eq-3, the inductor current IL has ripple $$\Delta IL = [(VIN - VOUT)/L] \times TON \quad \text{[Eq-4]}$$
$$= [(VIN - VOUT)/L] \times$$
$$[(C \times V \times RTON)/(VIN - Vref)]$$
$$= (C \times V \times RTON)/L$$
$$= \text{constant.}$$

And, due to $$\Delta IL = (VOUT/L) \times TOFF, \quad \text{[Eq-5]}$$

the off time is $$TOFF = \Delta IL \times (L/VOUT), \quad \text{[Eq-6]}$$

Figure 8:
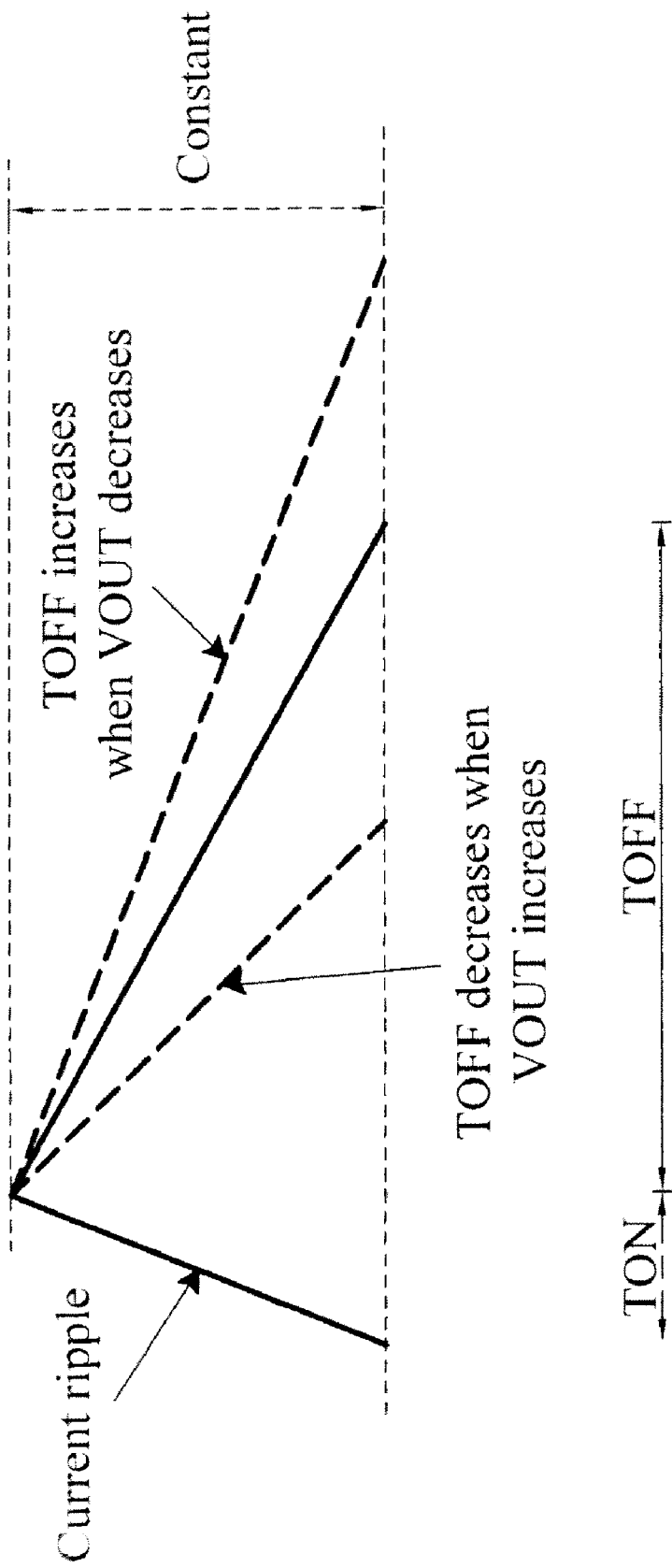
FIG. 8 is a schematic view of an output current ripple whose off time varies with the output voltage.
Figure 9:
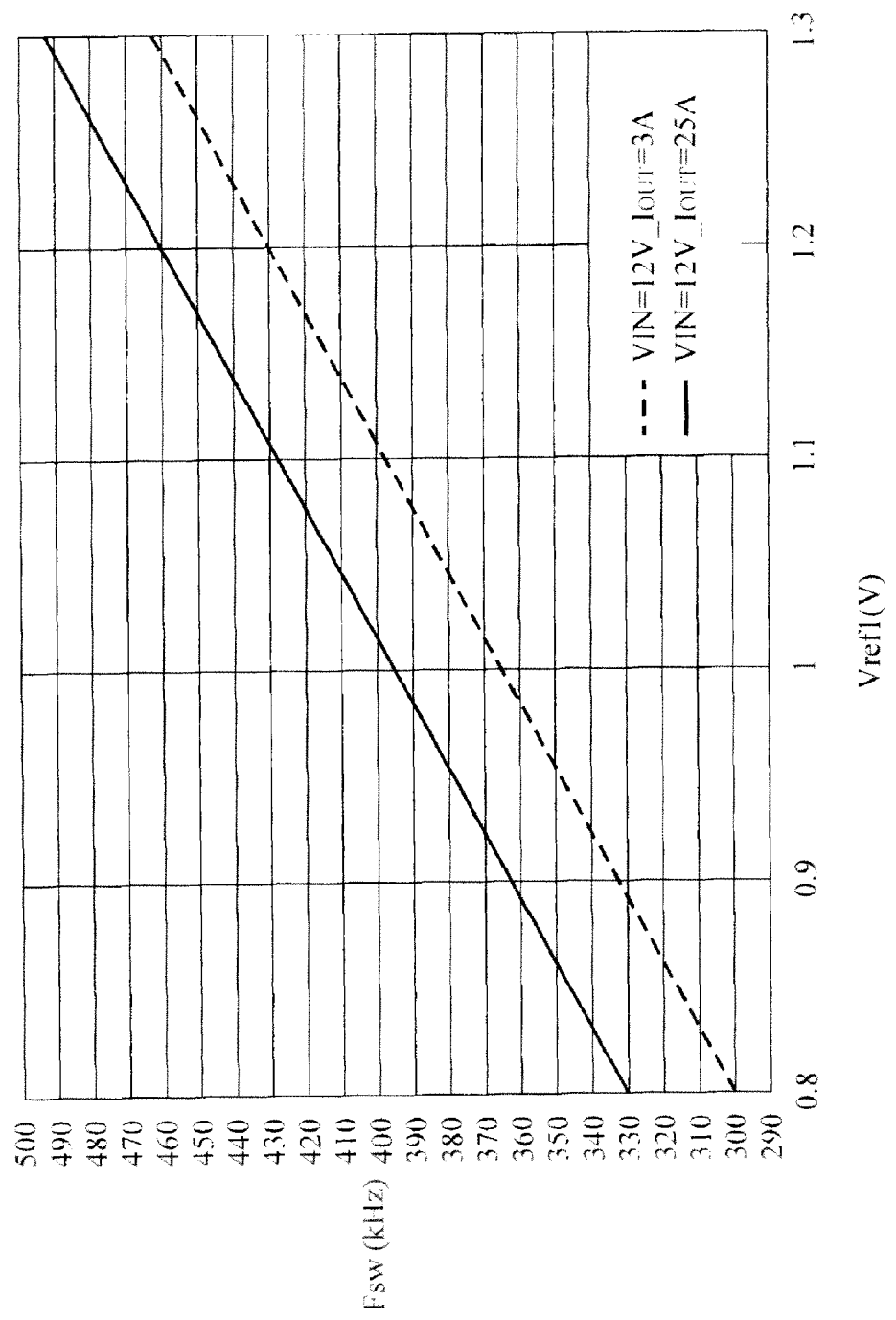
FIG. 9 is a chart of simulation result obtained from a voltage regulator according to the present invention.

According to the equation Eq-4, the ripple AIL is a constant, and by substituting the constant into the equation Eq-6, it is known that the off time TOFF is proportional to 1/VOUT. In other words, with the CCR topology, as shown in FIG. 8, if the output voltage VOUT increases, the off time TOFF will become shorter and the frequency of the pulse width modulation signal PWM will increase; and if the output voltage VOUT decreases, the off time TOFF will become longer and the frequency of the pulse width modulation signal PWM will decrease. As can be seen from the simulation result shown in FIG. 9, when the reference signal Vref increases, the frequency Fsw of the pulse width modulation signal PWM will also increase correspondingly. When the voltage regulator provides different load currents $I_{OUT}$ (3 A/25 A), i.e. at different loading, the frequency of the pulse width modulation signal PWM will be adjusted accordingly.

Although the above description is described with reference to a single-phase buck CCR voltage regulator, the adjuster 44 can also be applied to multi-phase buck CCR voltage regulators, single-phase boost CCR voltage regulators, multi-phase boost CCR voltage regulators, and other types of single-phase or multi-phase buck or boost DC-DC voltage regulators.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A voltage regulator comprising:
   an output stage receiving an input voltage from a power input terminal, operative to supply an output voltage and a load current at a power output terminal;
   a feedback circuit including:
     an error amplifier connected to the output stage, for generating an error signal according to a difference between an output-dependent feedback signal and a reference signal; and
     a comparator connected to the error amplifier, for comparing the error signal with a ripple signal to generate a comparison signal used for operating the output stage to convert the input voltage to the output voltage; and
   an adjuster connected to the output stage, operative to generate an adjust signal according to the load current to adjust at least one of the feedback signal, the reference signal, the error signal and the ripple signal to thereby adjust the output voltage such that the output voltage increases with an increase of the load current and decreases with a decrease of the load current.

2. The voltage regulator of claim 1, wherein the adjuster comprises:
   a current monitor operative to generate a monitoring voltage according to the load current;
   a second comparator connected to the current monitor, for asserting a first signal when the monitoring voltage is higher than a first threshold value;
   a third comparator connected to the current monitor, for asserting a second signal when the monitoring voltage is lower than a second threshold value smaller than the first threshold value;
   two power sources; and
   two switches connected between the feedback circuit and the two power sources respectively, and controlled by the first signal and the second signal respectively, to determine the adjust signal.

3. The voltage regulator of claim 2, wherein each of the two power sources comprises a current source.

4. The voltage regulator of claim 2, wherein each of the two power sources comprises a voltage source.

5. A method for automatically adjusting an output voltage according to a load current of a voltage regulator converting an input voltage to the output voltage by an output stage, the method comprising the steps of:
   (A) generating a feedback signal according to the output voltage;
   (B) amplifying a difference between the feedback signal and a reference signal for generating an error signal;
   (C) comparing the error signal with a ripple signal for generating a comparison signal used for operating the output stage to convert the input voltage to the output voltage; and
   (D) generating an adjust signal according to the load current for adjusting at least one of the feedback signal, the reference signal, the error signal and the ripple signal to thereby adjust the output voltage such that the output voltage increases with an increase of the load current and decreases with a decrease of the load current.

6. The method of claim 5, wherein the step (D) comprises the steps of:
   generating a monitoring voltage according to the load current;
   asserting a first signal when the monitoring voltage is higher than a first threshold value; and
   asserting a second signal when the monitoring voltage is lower than a second threshold value smaller than the first threshold value; and
   determining the adjust signal responsive to the first signal and the second signal.

\* \* \* \* \*